United States Patent [19]

Matsumoto et al.

[11] Patent Number: 5,615,568
[45] Date of Patent: Apr. 1, 1997

[54] APPARATUS AND METHOD OF DETECTING BENDER OPERATING TIME

[75] Inventors: Shigeharu Matsumoto; Nobuo Sakurai; Ichiro Kojima, all of Kanagawa, Japan

[73] Assignee: Amada Metrecs Company, Limited, Kanagawa, Japan

[21] Appl. No.: 532,142

[22] Filed: Sep. 22, 1995

[30] Foreign Application Priority Data

Oct. 3, 1994 [JP] Japan .................. 6-239307

[51] Int. Cl.⁶ .................. B21B 37/00
[52] U.S. Cl. .................. 72/20.1
[58] Field of Search .................. 72/20.1, 21.1, 72/389.3, 389.6

[56] References Cited

U.S. PATENT DOCUMENTS

| | | | |
|---|---|---|---|
| 3,594,644 | 7/1971 | List et al. | 72/11.8 |
| 4,797,831 | 1/1989 | Dressing et al. | 72/20.1 |
| 4,936,126 | 6/1990 | Sato | 72/20.1 |

*Primary Examiner*—David Jones
*Assistant Examiner*—John Paradiso
*Attorney, Agent, or Firm*—Greenblum & Bernstein, P.L.C.

[57] ABSTRACT

In a bender (e.g., press brake), work (plate material) can be bent by a bending tool composed of a pair of punch and die. A position detector (17) mounted on a movable side of the bending tool generates a limit point pulse (ULi) whenever the tool reaches a limit point. A timer (29) measures a time interval between the two limit point pulses (ULi). A time compare discriminate section (31) compares the time interval measured by the time with a reference time interval (TR), and further discriminates the current bending as trial bending when the time interval is longer than the reference time but as an actual bending when shorter than the reference time. Further, an arithmetic section 33 calculates a sum total number of times of the bending and the sum total time period spent in the bendings, separately in both of the trial and actual bendings. The obtained bending data are displayed or recorded to obtain an accurate man-hour in the bending processing.

7 Claims, 3 Drawing Sheets

APPARATUS AND METHOD OF DETECTING BENDER OPERATING TIME

BACKGROUND OF THE INVENTION

1. Field of the Invention

The present invention relates to an apparatus and a method of detecting the operating time of a bender, and more specifically to an apparatus and a method of detecting the operating time of a bender by separating the trial bendings from the actual bendings or vice versa.

2. Description of the Prior Art

A bender can bend work (i.e., a plate material) with the use a tool composed of a pair of punch and die brought into contact with and separated from each other. In the conventional bender, when a ram to which the die is mounted reaches an upper limit point, for instance, an upper limit point signal is generated, and the generated upper limit point signals are counted and recorded to count and record the upper limit point signals to detect the operating time of the bender.

In the conventional apparatus or method, however, since the number of times that the ram reaches the upper limit point is simply counted, there exists a problem in that it has been impossible to discriminate between the trial bendings and the actual bendings (products are bent actually) with respect to the number of bending times or the bending time period spent in the bendings.

This is because, originally, the trial bending time must be considered as the man-hour (workload of a standard worker for one hour) for setup, and the actual bending time must be considered as the man-hour for real operating. Therefore, when the trial and actual bending times cannot be discriminated, an accurate standard man-hour cannot be obtained, so that it is impossible to obtain a rational product plane and a reliable cost calculation or management.

SUMMARY OF THE INVENTION

With these problems in mind, therefore, it is the object of the present invention to provide an apparatus and a method of detecting bender operating time by discriminating the trial bendings from the actual bendings or vice versa.

To achieve the above-mentioned object, the present invention provides an apparatus for detecting operating time of a bender for bending plate work by use of a pair of punch and die, comprising: position detecting means (17) for generating a limit point pulse (ULi) whenever any one of the punch and the die reaches a limit position; timer means (29) for measuring a time interval between the two limit point pulses generated by said position detecting means; time comparing means (31) for comparing the time interval measured by said timer means with a reference time interval (TR); and discriminating means (31) for discriminating between a trial bending and an actual bending on the basis of a comparison result of said time comparing means, to obtain trial bending operating time and actual bending operating time, separately.

Here, when the time interval measured by said time comparing means is longer than the reference time, said discriminating means decides that the current bending is a trial bending, and when the time interval measured by said time comparing means is shorter than the reference time, said discriminating means decides that the current bending is an actual bending.

Further, it is preferable that the apparatus further comprises calculating means (33) for calculating a sum total number of times of the trial or actual bendings and a sum total time period spent in the trial or actual bendings, on the basis of the measured limit point pulses. Further, it is preferable that the outputting means (25) for outputting the discriminated results and the calculated results. Here, the outputting means is a display unit and/or a recorder.

Further, the present invention provides a method of detecting operating time of a bender, comprising the steps of: setting a reference bending time interval (TR); generating a tool limit point signal (ULi) whenever a tool reaches a limit position; measuring a time interval between the two generated tool limit point signals; comparing the measured time interval with the set reference bending time interval (TR); discriminating present bending as a trial bending when the measured time interval is longer than the set reference bending time interval, and as an actual bending when the measured time interval is shorter than the set reference bending time interval; calculating a sum total number of times of the bendings and a sum total time period spent in the bendings, by separating the trial bendings from the actual bendings or vice versa; and recording the calculated results of the trial and actual bendings, separately.

As described above, in the bender operating time detecting apparatus and method according to the present invention, since the upper limit point signals of the tool are detected and since the time interval between the two limit point pulses is compared with a reference time interval, it is possible to discriminate the trial bending and the actual-bending on the basis of the comparison result, in such a way that when the time interval is longer than the reference time, the current bending is a trial bending and when shorter than the reference time, the current bending is an actual bending. In addition, it is possible to obtain the sum total number of times of the bendings and the sum total time period spent in the bendings. The obtained results can be displayed or recorded according to the requirements.

As a result, an accurate man-hour can be detected by separating the trial bending process from the actual bending process or vice versa, so that a rational product plan or a reliable cost calculation can be realized.

DETAILED DESCRIPTION OF THE EMBODIMENTS

An embodiment of the present invention will be described hereinbelow with reference to the attached drawings.

Figure 1:
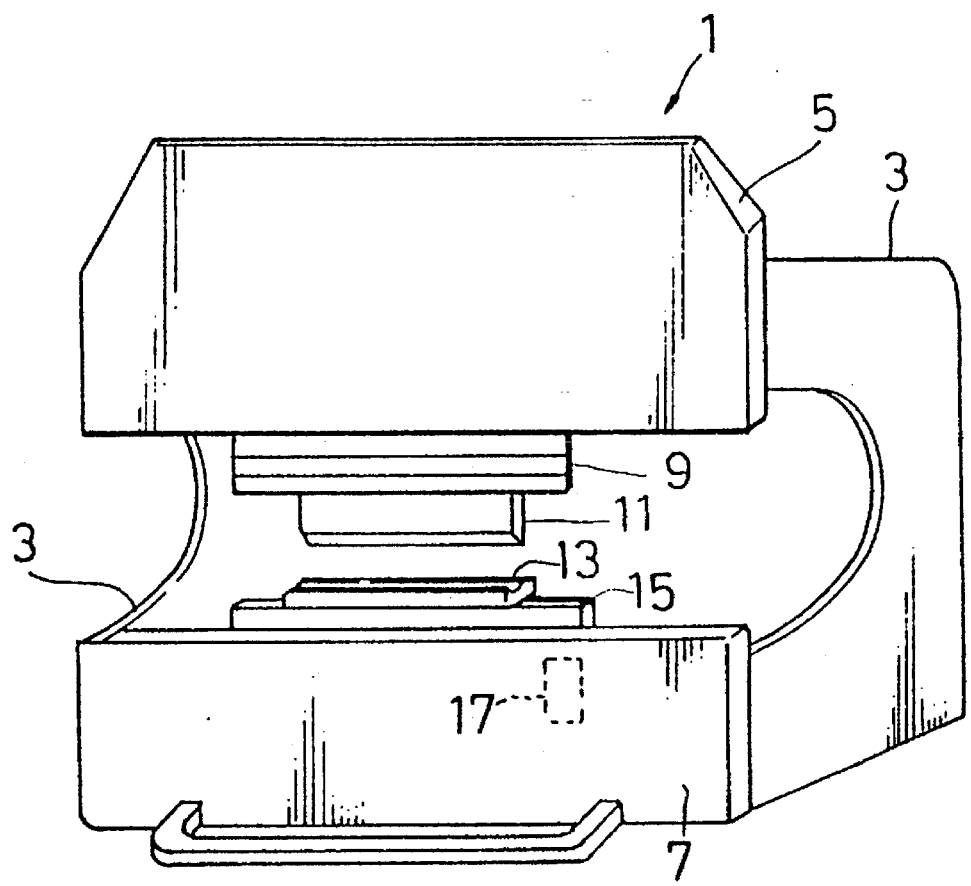
FIG. 1 is a perspective view showing a brake press as an example of the bender.

FIG. 1 shows a press brake as an example of the bender. In the press brake 1, a C-shaped (when seen from the side) side-surface frame 3 is provided so that the open side thereof is directed frontward. Further, an upper frame 5 is fixed integral with the upper portion of the side-surface frame 3, and a lower frame 7 is fixed integral with the lower portion of the same side-surface frame 3.

A punch 11 is fixed to the lower side of the upper frame 5 via a punch holder 9. Further, on the inner side of the lower frame 7, a die 13 opposing to the punch 11 is mounted on a ram 15 movable up and down. Further, a ram position detecting unit 17 is mounted on the ram 15 to generate an upper limit point signal whenever the ram 15 reaches the uppermost-position during the operation.

Accordingly, when bending work is started by use of the press brake 1 as described above, a predetermined pair of the punch 11 and the die 13 are set; after that, work (e.g., plate material) is set at a predetermined work position; and then the ram 15 is moved up and down to bend the work in cooperation with the punch 11 and the die 13.

In this case, it is necessary to check bending results (bent angle, bent state etc.) during a trial bending process, before actual products are bent. That is, after a desired bending work has been confirmed, the upper limit point position is set on the basis of the trial bending results, and after that the work is actually processed for bending.

Figure 2:
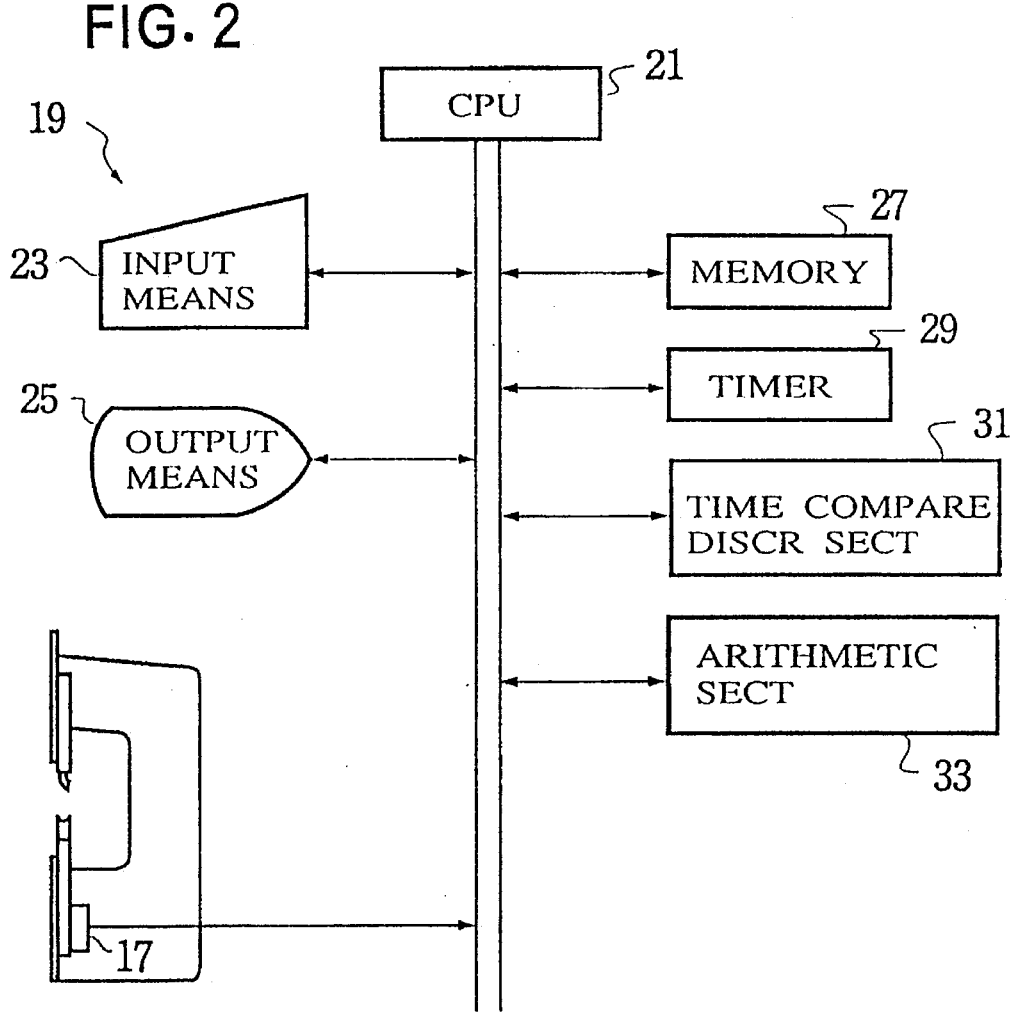
FIG. 2 is a block diagram showing the construction of the bender operating time detecting apparatus according to the present invention.

Here, the ram position detecting unit 17 mounted on the ram 15 keeps transmitting an upper limit point pulses UL to the operating time detecting apparatus 19 as shown in FIG. 2, irrespective of the trial bending or the actual bending.

The operating time detecting apparatus 19 of the present invention will be explained with reference to FIG. 2.

The operating time detecting apparatus 19 is composed mainly by a CPU 21. Further, various external instruments are connected to the CPU 21, such as a keyboard (input means) 23, a CRT and/or a recorder (output means) 25 for displaying or recording the detected results, the ram position detecting unit 17, etc. In addition, the CPU 21 is connected via a bus to a memory 27, a timer 29, a time compare discriminate section 31, and an arithmetic section 33, etc.

Figure 3:
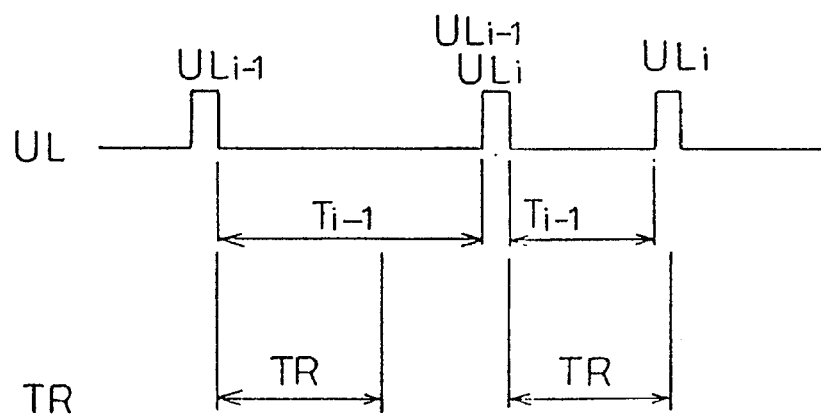
FIG. 3 is an illustration showing the relationship between the actually measured operating time and the reference time interval.

As shown in FIG. 3, the memory 27 stores a previously determined reference time interval (TR). Further, the timer (timer means) 29 measures the actual time intervals (Ti–1) of the ram up-and-down motion; and the time compare discriminate section (time comparing and discriminating means) 31 compares the actual time interval (Ti–1) measured by the timer 29 with the reference time TR, and discriminates the current bending as follows: when the time interval measured by the timer is longer than the reference time, the current bending is a trial bending, and when the time interval measured by the timer is shorter than the reference time, the current bending is an actual bending. Further, the arithmetic section 33 calculates a sum total number of times of bendings and a sum total time period spent in the bendings, on the basis of the measured limit point pulses, separately in both the trial and actual bendings.

The operation of the operating time detecting apparatus 19 will be described hereinbelow.

Previously, a reference time interval TR is inputted by use of the keyboard 23 and stored in the memory 27. Here, the reference time interval TR is a reference time interval determined in such a way that as to be shorter than the trial bending time but longer than the actual bending time.

Accordingly, it is possible to discriminate the bending time interval as the trial bending when the bending time is longer than the reference time interval TR, but as the actual bending when shorter than the reference time interval TR. In other words, in general, a long trial bending time is required as compared with a short actual bending time. This is because in the case of the trial bending, it is necessary to check various bending conditions (e.g., bent angle, bent state, etc.) or to adjust the upper limit point of the ram 15. On the other hand, in the case of the actual bending, only work (plate material) is exchanged.

Figure 4:
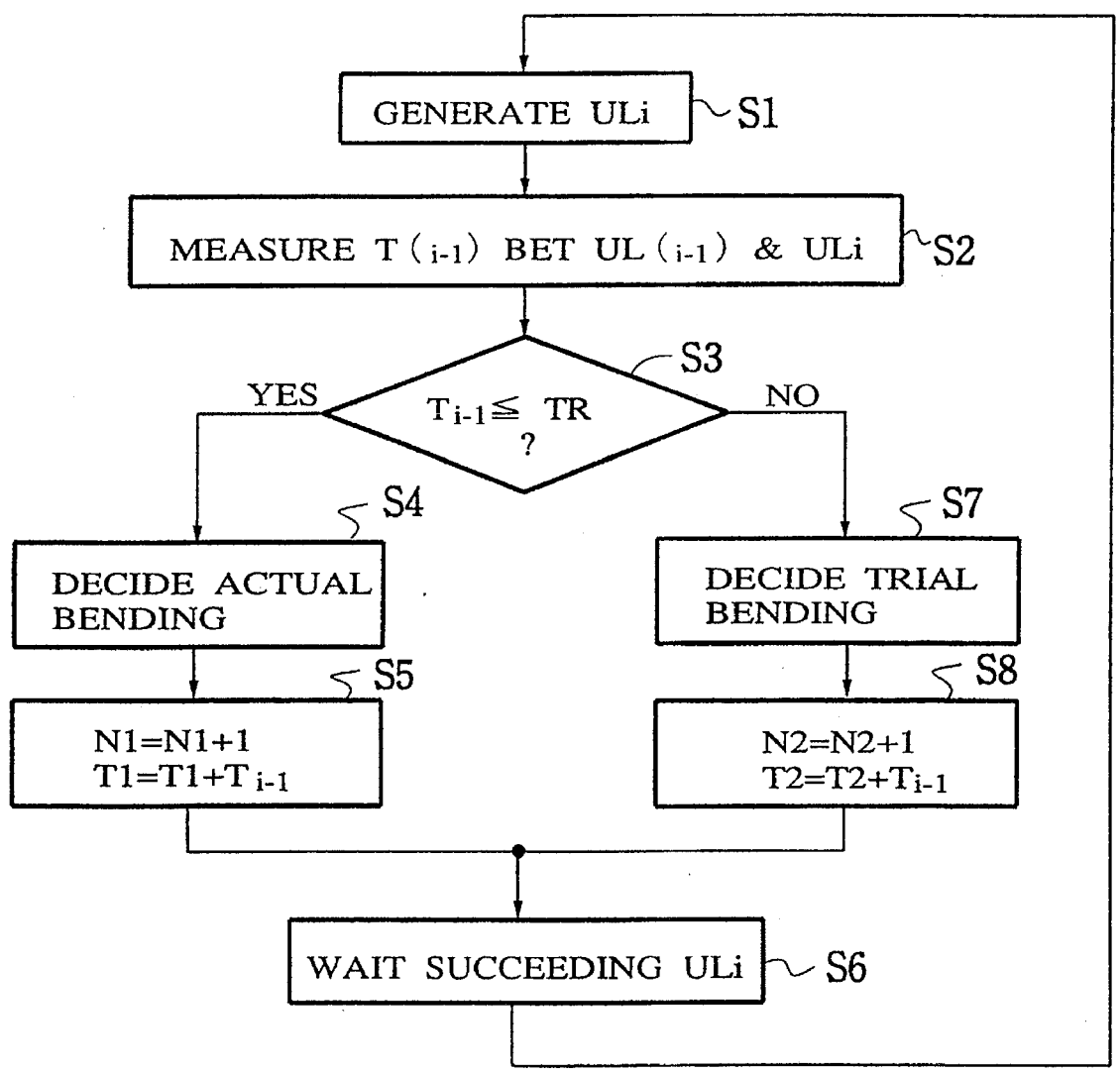
FIG. 4 is a flowchart for assistance in explaining the method of detecting the bender operating time according to the present invention.

The operation of the operating time detecting apparatus 19 according to the present invention will be described hereinbelow with reference to a flowchart shown in FIG. 4.

In step S1, the position detecting unit 17 generates the upper limit point pulses UL(i) and the generated pulses are transmitted to the timer 29. In step S2, the timer 29 measures the time interval as T(i–1)=Ul(i)–UL(i–1), in sequence, respectively.

In step S3, the time compare discriminate section 31 compares the measured time interval T(i–1) with the reference time interval TR stored in the memory 27. If the measured time interval T(i–1) is equal to or shorter than the reference time interval TR, the current bending processing is decided as the actual bending in step S4. On the other hand, if the measured time interval T(i–1) is longer than the reference time interval TR, the current bending processing is decided as the trial bending in step S7.

In the case of decision of the actual bending processing in step S4, in step S5 one is added to the total number N1 of times of the actual bendings so far performed as N1=N1+1, and further one is added to the total bending time period T1 spent in the actual bendings so far performed, as T1=T1+T(i–1). In step S6, the time compare discriminate section 31 waits the succeeding upper limit point pulse ULi.

On the other hand, in the case of decision of the trial bending processing in step S7, in step S8 one is added to the total number N2 of times of the trial bendings so far performed as N2=N2+1, and further one is added to the total bending time period T2 spent in the trial bendings so far performed, as T2=T2+T(i–1). In step S6, the time compare discriminate section 31 waits the succeeding upper limit point pulse ULi.

The same steps as described above is repeated. The sum total number of times of the bendings and the sum total time period spent in the bendings can be both displayed or recorded by an output means 25 (a CRT display or a printer), at needs.

As described above, in the bender operating time detecting apparatus and method according to the present invention, since the upper limit point pulses of the ram are detected and since the time interval between the two limit point pulses is compared with the reference time interval, it is possible to discriminate the trial bending from the actual bending or vice versa, on the basis of the comparison result, in such a way that when the time interval is longer than the reference time, the current bending is a trial bending and when shorter than the reference time, the current bending is an actual bending.

In addition, it is possible to obtain the sum total number of times of the bendings and the sum total time period spent in the bendings. The obtained results can be displayed or recorded according to the requirements.

As a result, an accurate man-hour can be detected by separating the trial bending process from the actual bending process or vice versa, so that a rational product plan and a reliable cost calculation can be realized.

What is claimed is:

1. An apparatus for detecting operating time of a bender for bending plate work by use of a punch and die pair, comprising:

position detecting means for generating a limit point pulse whenever either the punch or the die reaches a limit position;

timer means for measuring a time interval between the two successive pulses generated by said position detecting means;

time comparing means for comparing the time interval measured by said timer means with a reference time interval; and discriminating means for discriminating between a trial bending and an actual bending on the basis of a comparison result of said time comparing means, to obtain trial bending operating time and actual bending operating time, separately.

2. The apparatus for detecting operating time of a bender of claim 1, wherein when the time interval measured by said time comparing means is longer than the reference time, said discriminating means decides that the instant bending is a trial bending, and when the time interval measured by said time comparing means is shorter than the reference time, said discriminating means decides that the instant bending is an actual bending.

3. The apparatus for detecting operating time of a bender of claim 1, which further comprises calculating means for calculating a sum total number of times of the trial or actual bendings and a sum total time period spent in the trial or actual bendings, on the basis of the measured limit point pulses.

4. The apparatus for detecting operating time of a bender of claim 3, which further comprises outputting means for outputting the discriminated results and the calculated results.

5. The apparatus for detecting operating time of a bender of claim 4, wherein said outputting means is a display unit.

6. The apparatus for detecting operating time of a bender of claim 4, wherein said outputting means is a recorder.

7. The apparatus for detecting operating time of a bender of claim 1, wherein a limit point pulse is generated whenever the punch reaches a lower limit position or the die reaches an upper limit position.

* * * * *